(No Model.)

F. WESTWOOD & W. H. BUTLER.
WHEEL FOR VELOCIPEDES.

No. 486,146. Patented Nov. 15, 1892.

WITNESSES.
Will. H. James.
G. S. Clark.

INVENTORS.
Frederick Westwood.
William. H. Butler.

per
Robt. d. Phillips.
Attorney.

THE NORRIS PETERS CO., PHOTO-LITHO., WASHINGTON, D. C.

United States Patent Office.

FREDERICK WESTWOOD AND WILLIAM HENRY BUTLER, OF BIRMINGHAM, ENGLAND.

WHEEL FOR VELOCIPEDES.

SPECIFICATION forming part of Letters Patent No. 486,146, dated November 15, 1892.

Application filed February 9, 1892. Serial No. 420,830. (No model.) Patened in England February 11, 1890, No. 2,202.

*To all whom it may concern:*

Be it known that we, FREDERICK WESTWOOD and WILLIAM HENRY BUTLER, both subjects of the Queen of Great Britain, residing at Birmingham, in the county of Warwick, England, have invented a new and useful Improvement in Wheels for Velocipedes and other Light Vehicles, (for which we have obtained a patent in Great Britain, No. 2,202, dated February 11, 1890,) of which the following is a specification.

Our invention relates to an improved rim; and it consists in forming on each edge of the rim, on the outer face thereof, a hollow bead or chamber of any suitable size and shape, according to the type of wheel it is intended for, the objects being, first, to enable the spokes of the wheel to be attached to the edges of the rim instead of to the center thereof, thereby minimizing the transmission of the concussions on the tire to the machine; secondly, to facilitate the replacement of broken spokes, which can be effected without disturbing the elastic tire, and, lastly, to produce a rigid and at the same time light rim. We attain these ends in the manner illustrated by the accompanying drawings, in which—

Figure 1:
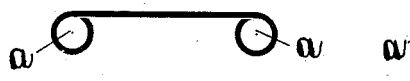

Figure 1 is a view in transverse section of a rim constructed according to our invention, and Figs. 2, 3, 4, 5, and 6 are modifications thereof.

Throughout the several views similar parts are marked with like letters of reference.

Figure 2:
Figure 3:
Figure 4:
Figure 5:
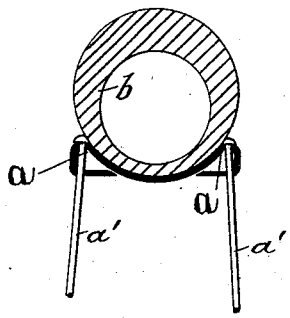
Figure 6:
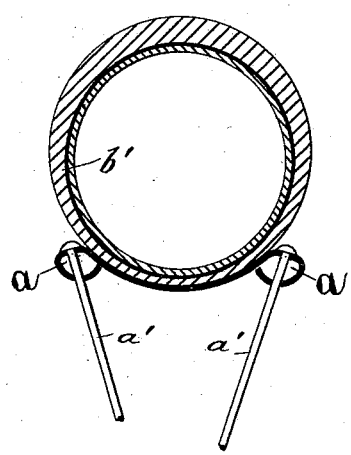

The rims are formed by turning over the edges of the strip of metal out of which each rim is made to form hollow or tubular beads or chambers $a\ a$ along the outer face of each edge, the face of the rim adapted to receive the tire being rolled to the required shape, which may be anything from completely flat, as shown by Fig. 1, to sufficiently concave to receive the smallest round tire, as shown by Fig. 2. The beads or chambers $a\ a$ may take the form in transverse section of true circles, as shown by Figs. 1 and 2, or any other form which the type of wheel or the arrangement of the spokes demands, of which Figs. 4, 5, and 6 are examples, and they may be formed of one thickness of metal, as shown by Figs. 1, 2, 4, 5, and 6, or by two or more thicknesses, as shown by Fig. 3. When the beads or chambers are of any other shape than circular in cross-section, they are inclined with respect to the face of the rim, according as the spokes $a'$ are intended to be connected to the flange of the hub on the same side of the wheel, as shown by Fig. 5, or to the flange of the hub on the opposite side thereof, as shown by Fig. 6. The heads of the spokes $a'$ or the nipples therefor may rest either on the outer faces of the hollow beads or chambers $a\ a$ or on the inner faces thereof, in which case the edges of the strips are preferably brazed where they meet the body thereof.

Our improved rim is adapted to take any type of tire, Figs. 5 and 6 being examples of rims fitted with cushion and pneumatic tires $b$ and $b'$, respectively.

It will be seen that by this construction of rim the edges become the stiffest parts, thus enabling the spokes to be connected to the rim in close proximity to its edges and so permitting them to be taken out and replaced without removing any part of the tire from the rim, as by merely pressing the tire back at any particular point any spoke can be withdrawn from or inserted in the rim.

What we claim is—

In a wheel, the combination, with the rim having its side edge bent over inwardly toward the wheel center, thereby forming hollow chambers $a$, of the tire secured to the rim between the said chambers and the spokes passing through holes in the edges of the rim below the said chambers and through holes in the rim above the said chambers and provided with heads bearing on the rim close to the tire, substantially as set forth.

FREDERICK WESTWOOD.
WILLIAM HENRY BUTLER.

Witnesses:
HERBERT FRANK BEAMISH,
FREDERICK HALE.